United States Patent
Horng et al.

(10) Patent No.: US 6,787,965 B1
(45) Date of Patent: Sep. 7, 2004

(54) SINGLE MAGNETIC CONDUCTIVE PLATE STRUCTURE FOR FORMING A SINGLE POLE PLATE BRUSHLESS DC MOTOR

(75) Inventors: Alex Horng, Kaohsiung (TW); Yin-Rong Horng, Kaohsiung (TW); Ching-Sheng Hong, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 0 days.

(21) Appl. No.: 10/382,911

(22) Filed: Mar. 7, 2003

(51) Int. Cl.⁷ .................................................. H02K 1/12
(52) U.S. Cl. .................. 310/257; 310/156.32; 310/254; 310/266; 310/DIG. 6
(58) Field of Search .......................... 310/42, 254, 257, 310/49 R, DIG. 6, 156.32, 266; 29/596

(56) References Cited

U.S. PATENT DOCUMENTS

| | | | | |
|---|---|---|---|---|
| 2,323,035 A | * | 6/1943 | Hansen et al. | 310/164 |
| 3,504,253 A | * | 3/1970 | Kavanaugh | 318/138 |
| 3,558,940 A | * | 1/1971 | Chestnut et al. | 310/41 |
| 4,059,780 A | * | 11/1977 | Mazuir | 310/164 |
| 5,831,359 A | * | 11/1998 | Jeske | 310/68 B |
| 5,847,485 A | * | 12/1998 | Suzuki et al. | 310/257 |
| 5,854,526 A | * | 12/1998 | Sakamoto | 310/254 |
| 6,509,666 B1 | * | 1/2003 | Huang et al. | 310/254 |

FOREIGN PATENT DOCUMENTS

JP    58-127549    *    7/1983    ........ H02K/21/22

* cited by examiner

*Primary Examiner*—Burton Mullins
(74) *Attorney, Agent, or Firm*—Bacon & Thomas, PLLC

(57) ABSTRACT

A single magnetic conductive plate for a single pole plate brushless dc motor comprises a pole plate, a plurality of pole faces, and an axial hole. The pole plate, the pole faces and an axial hole are integrated into the single magnetic conductive plate. The pole plate is regarded as a base and adapted to combine with a coil to form a stator. The pole faces are punched and equi-spaced round the axial hole proximal the coil. The axial hole is adapted to combine with a mounting seat for supporting a rotor.

14 Claims, 6 Drawing Sheets

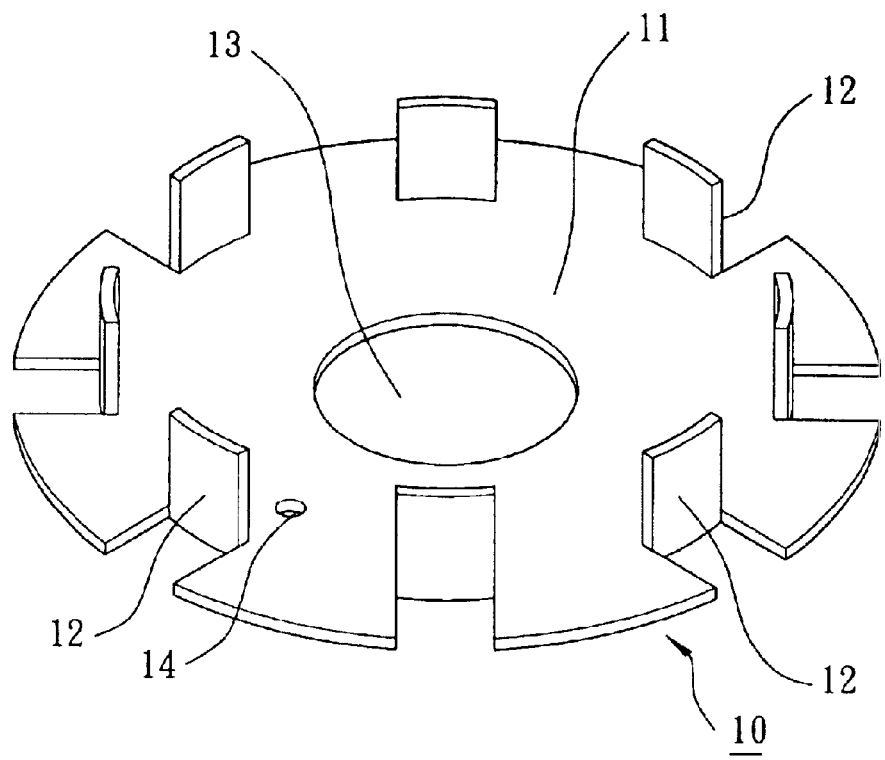
F I G . 2
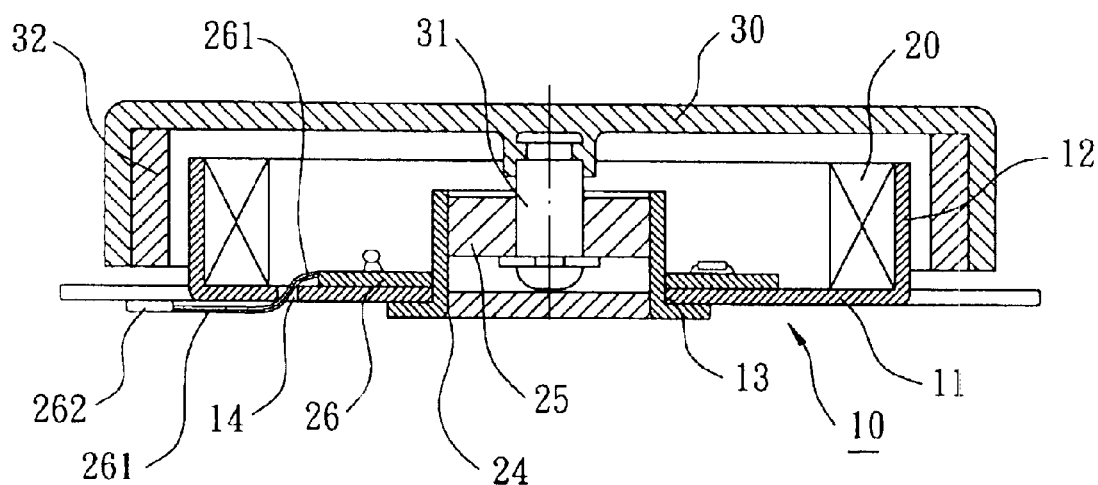
F I G . 3

SINGLE MAGNETIC CONDUCTIVE PLATE STRUCTURE FOR FORMING A SINGLE POLE PLATE BRUSHLESS DC MOTOR

BACKGROUND OF THE INVENTION

1. Field of the Invention

The present invention is relates to a single magnetic conductive plate structure for forming a single pole plate brushless dc motor and more particularly to a single magnetic conductive plate being punched to form a pole plate, pole faces, an axial hole and a base to reduce the number of stator members.

2. Description of the Related Art

Referring to FIG. 1, an axial winding stator generally comprises an upper pole plate set 10a, a lower pole plate set 10b, a coil 20, a stator seat 21, and an axial tube 22. The pole plate sets 10a and 10b are attached to either side of the stator seat 21 and consist of pole plates 11a and 11b, and pole faces 12a and 12b. In an assembly operation, the coil 20 is wound around the stator seat 21 and the axial tube 22 is extended successively through an axial hole 13a of the upper pole plate set 10a, a center hole 23 of the stator seat 21 and an axial hole 13b of the lower pole plate set 10b to form a motor stator. Consequently, the stacked combination of the stator members must increase their axial thickness. However, the total thickness of the conventional motor cannot be effectively reduced and it is undesired for an electronic device with a specific thin thickness, a notebook computer for example.

The present invention intends to provide a single magnetic conductive plate punched to form a pole plate, pole faces, an axial hole, and a base such that the number of stator members is reduced. The base is adapted to support a coil and a substrate to reduce a total thickness of a stator and manufacture costs in such way as to mitigate and overcome the above problem.

SUMMARY OF THE INVENTION

The primary objective of this invention is to provide a single magnetic conductive plate for forming a single pole plate brushless dc motor, which is punched to form a pole plate, pole faces, an axial hole and a base so as to reduce the count of the stator members and an axial thickness thereof.

The secondary objective of this invention is to provide the single magnetic conductive plate for forming the single pole plate brushless dc motor, which is regarded as a base for supporting a coil and a substrate so as to simplify the entire structure of the stator and reduce manufacture cost.

The single magnetic conductive plate for forming the single pole plate brushless dc motor of the present invention mainly comprises a pole plate, a plurality of pole faces, and an axial hole. The pole plate, the pole faces and an axial hole are integrated into the single magnetic conductive plate. The pole plate is regarded as a base and adapted to combine with a coil to form a stator. The pole faces are punched and equi-spaced round the axial hole proximal the coil. The axial hole is adapted to combine with a mounting seat for supporting a rotor.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein:

FIG. 2 is a perspective view of a single magnetic conductive plate in accordance with a first embodiment of the present invention;

FIG. 3 is a cross-sectional view of combination of a single pole plate brushless motor with a rotor in accordance with the first embodiment of the present invention.

DETAILED DESCRIPTION OF THE INVENTION

Figure 1:
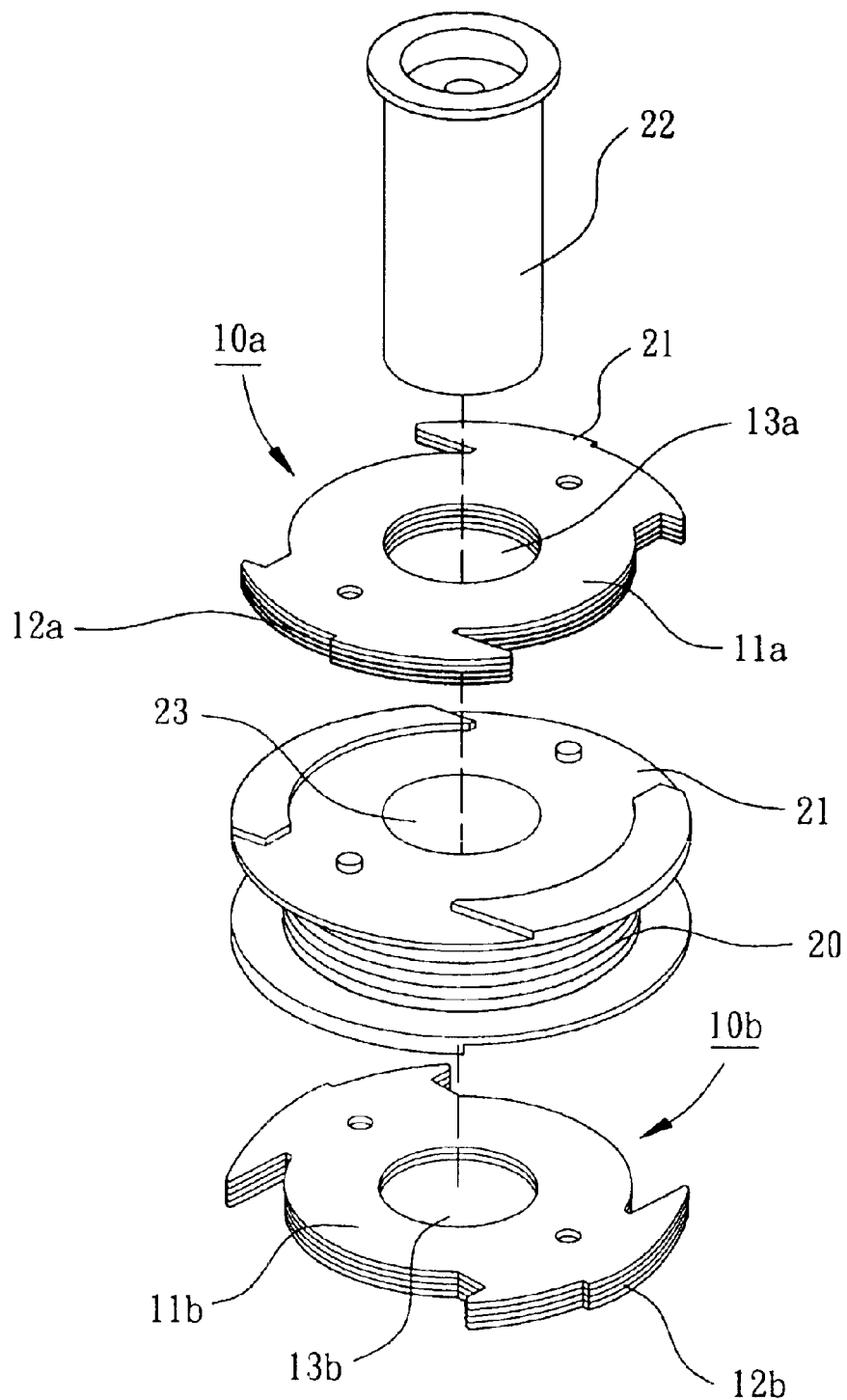
FIG. 1 is an exploded perspective view of a conventional brushless dc motor in accordance with prior art.

Referring now to the drawings, there are four embodiments of the present invention shown therein, all of which include generally a primary stator member and a secondary rotor member.

Referring initially to FIGS. 2 and 3, a single pole plate brushless dc motor in accordance with the present invention generally includes a single magnetic conductive plate designated as numeral 10, a coil designated as numeral 20, and a rotor designated as numeral 30. The axial combination of the single magnetic conductive plate 10 and the coil 20 is adapted to combine with the rotor 30 to form a single pole plate brushless dc motor.

Construction of the single magnetic conductive plate 10 shall be described in detail, referring now to FIGS. 2 and 3. The single magnetic conductive plate 10 is punched and formed by a magnetic-conductive sheet. The single magnetic conductive plate 10 comprise a pole plate 11, a plurality of pole faces 12 forming a complete set of pole faces for the single pole plate motor, and an axial hole 13. The main body of the single magnetic conductive plate 10 is formed as the pole plate 11 and it is regarded as a base for supporting stator members—a coil 20 and a substrate 26 for example. The pole faces 12 are projected in a vertical direction from the pole plate 11 and circle a space round the axial hole 13 for accommodating stator components. The axial hole 13 is formed at a center of the pole plate 11 and adapted to receive a mounting seat 24 and a bearing 25 to thereby form a stator. In an assembly operation, the bearing 25 is employed for receiving passage of a shaft 31 of the rotor 30 so that a permanent magnet 32 of the rotor 30 is able to radially align with one of an inner circumference or an outer circumference of the pole faces 12. On the other hand, the coil 20 is attached to the other circumference of the pole faces 12 while a radial air gap is formed between the pole faces 12 and the permanent magnet 32, which have a predetermined distance therebetween. In rotation operation, when the substrate (PCB) 26 energizes the coil 20, the pole faces 12 generate an alternating magnetic field in the air gap to thereby rotate the rotor 30.

Assembling the stator shall now be described with reference to FIG. 3. The pole plate 11 is further provided with a through hole 14 through which a wire 261 of the substrate 26 is passed and it is extended to a recession (not shown) proximal the permanent magnet 32. A Hall element 262 is placed in the recession to thereby extend proximal the permanent magnet 32 and detects its poles during operation. In addition, in manufacture operation of the single magnetic conductive plate 10, the mounting seat 24 is integrally projected from the axial hole 13 in vertical to thereby reduce stator members in amount.

Referring to FIGS. 4 through 11, reference numerals of second through fourth embodiments have applied the identical numerals of the first embodiment. Single magnetic conductive plates of the second through fourth embodiments have the similar configuration and same function as the first embodiment and the detailed descriptions are omitted.

Figure 4:
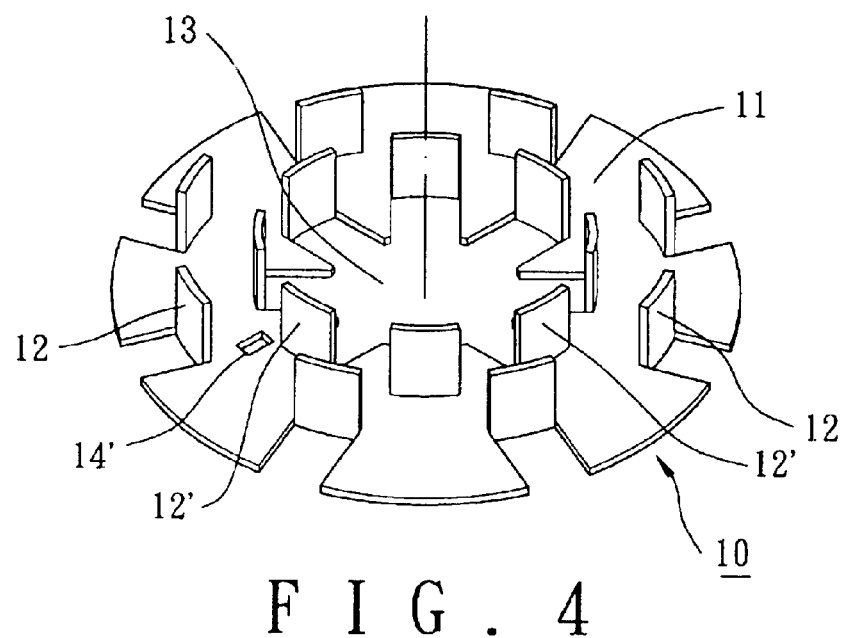
FIG. 4 is a perspective view of a single magnetic conductive plate in accordance with a second embodiment of the present invention.
Figure 5:
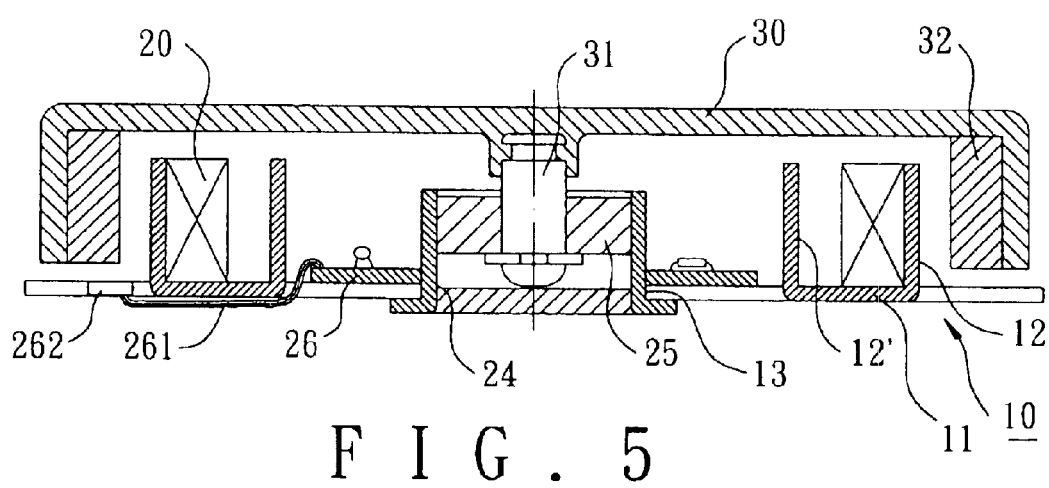
FIG. 5 is a cross-sectional view of the combination of a first single pole plate brushless motor with a rotor in accordance with the second embodiment of the present invention.
Figure 6:
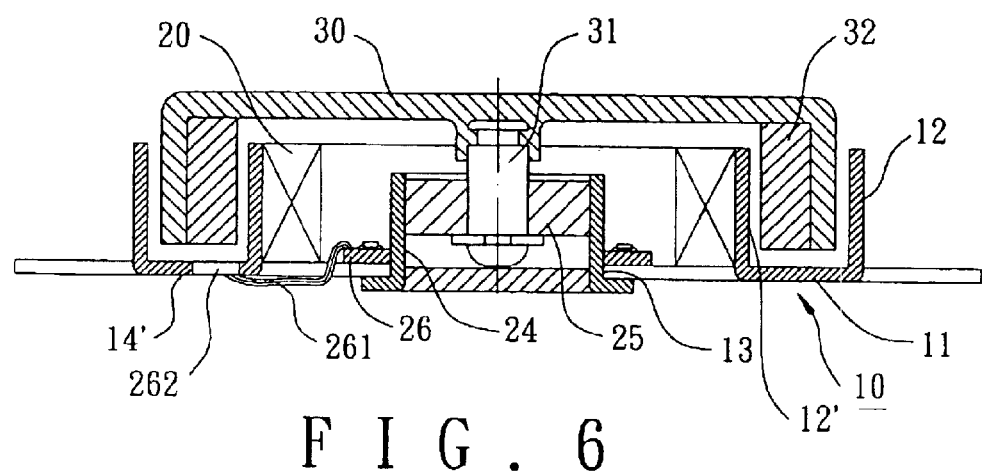
FIG. 6 is a cross-sectional view of the combination of a second single pole plate brushless motor with a rotor in accordance with the second embodiment of the present invention.
Figure 7:
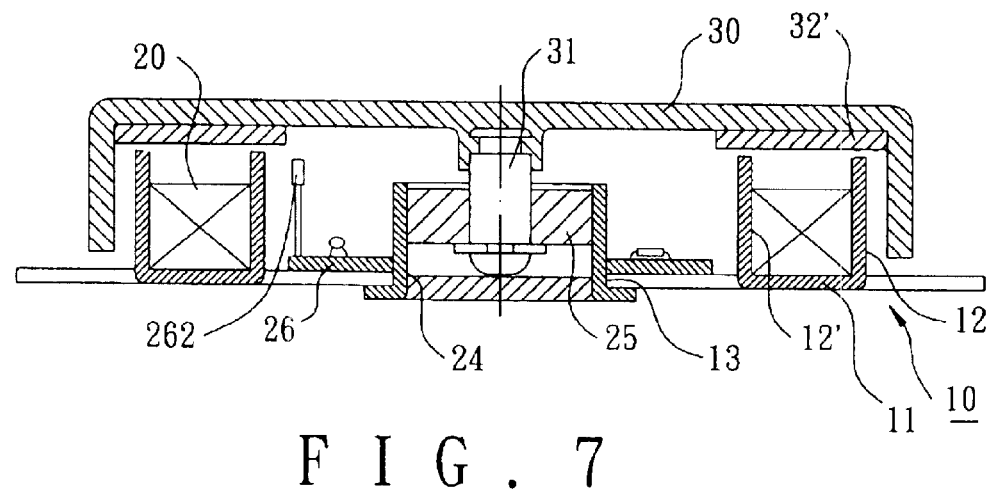
FIG. 7 is a cross-sectional view of the combination of a third single pole plate brushless motor with a rotor in accordance with the second embodiment of the present invention.

Referring to FIGS. 4 and 5, a single magnetic conductive plate 10 in accordance with the second embodiment, in comparison with the first embodiment, comprises an additional set of pole faces 12'. The pole faces 12' are formed from an inner periphery of the axial hole 13 and serve as an inner pole face set while the pole faces 12 serve as an outer pole face set. In structural arrangement, the pole faces 12 and 12' are equi-spaced on two concentric circles round the axial hole 13. Preferably, the two sets of the pole faces 12 and 12' are arranged in staggered manner or radial aligned manner so that the design choice of the single magnetic conductive plate is increased.

Referring again to FIG. 5, in an assembly operation, the coil 12 is proximal the inner circumferences of the pole faces 12. It is a preferred choice that the rotor 30 is formed with a relatively large diameter so that the permanent magnet 32 of the rotor 30 is aligns with an outer circumference of the pole faces 12. In rotation operation, an alternating magnetic field of the pole faces 12 drives the permanent magnet 32 of the rotor 30.

Referring again to FIG. 6, in an assembly operation, the coil 12 is proximal the inner circumferences of the pole faces 12'. It is another preferred choice that the rotor 30 is formed with a relatively small diameter so that the permanent magnet 32 of the rotor 30 is runs between the two sets of pole faces 12 and 12'. In rotation operation, an alternating magnetic field of the pole faces 12' drives the permanent magnet 32 of the rotor 30.

Referring again to FIG. 7, the single magnetic conductive plate 10 is applied to an axial air gap of the motor structure. The rotor 13 comprises an axial permanent magnet 32' to form an axial air gap with the pole faces 12 and 12'. In rotation operation, an alternative magnetic field of the pole faces is 12 and 12' drives the permanent magnet 32' of the rotor 30.

Referring again to FIG. 5, a wire 261 of the substrate 26 is passed through the pole faces 12' and extended to a through hole 14' proximal the permanent magnet 32. A Hall element 262 is placed in the through hole 14' to thereby extend proximal the permanent magnet 32 and detect its poles during operation.

Referring again to FIG. 6, a wire 261 of the substrate 26 is extended to the through hole 14' proximal the permanent magnet 32. A Hall element 262 is placed in the through hole 14' to thereby extend proximal the permanent magnet 32 and detect its poles during operation.

Referring again to FIG. 7, a Hall element 262 is projected from the substrate 26 to thereby extend proximal the permanent magnet 32 and detect its poles during operation.

Figure 8:
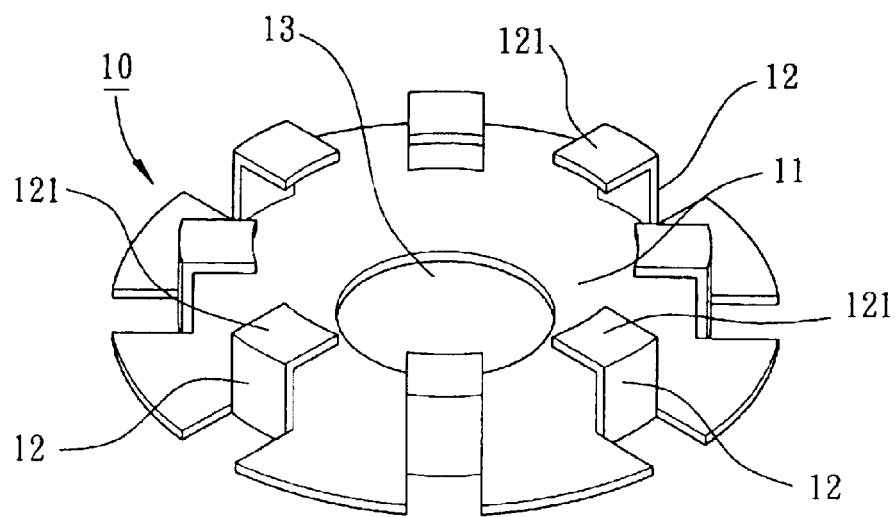
FIG. 8 is a perspective view of a single magnetic conductive plate in accordance with a third embodiment of the present invention.
Figure 9:
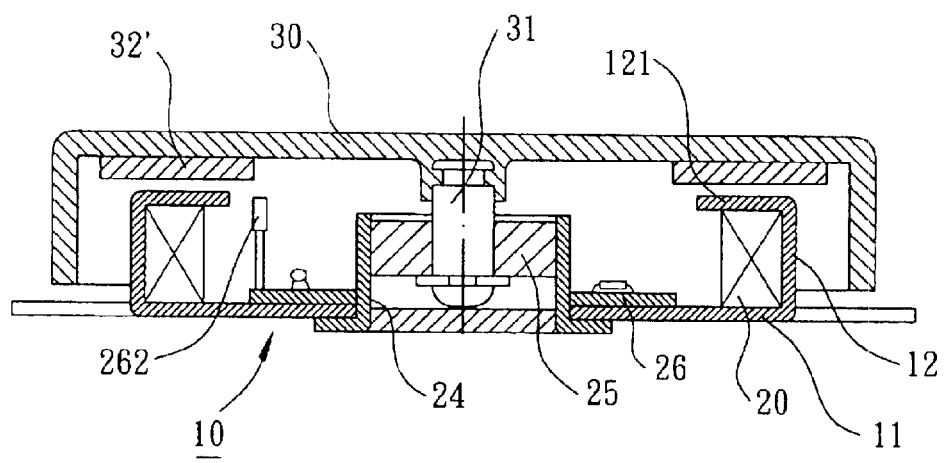
FIG. 9 is a cross-sectional view of the combination of a single pole plate brushless motor with a rotor in accordance with the third embodiment of the present invention.

Referring to FIGS. 8 and 9, a single magnetic conductive plate 10 in accordance with the third embodiment, in comparison with the first and second embodiments, comprises axial pole faces 121 instead of radial pole faces. The axial pole faces 121 are bent inward from the pole faces 12 and applied to an axial air gap of the motor structure.

Referring again to FIG. 9, in an assembly operation, the axial pole plates 121 face the axial permanent magnet 32' of the rotor 30 to form an axial air gap. In rotation operation, an alternating magnetic field of the pole faces 121 drives the axial permanent magnet 32, of the rotor 30.

Figure 10:
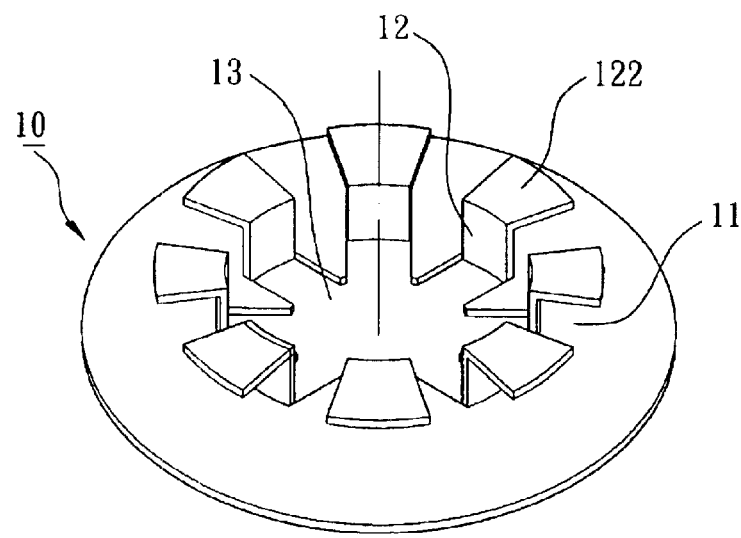
FIG. 10 is a perspective view of a single magnetic conductive plate in accordance with a fourth embodiment of the present invention.
Figure 11:
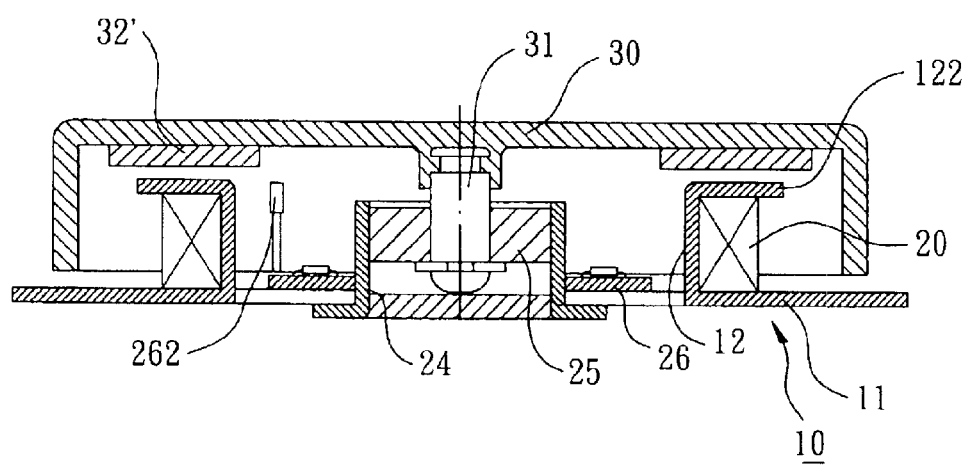
FIG. 11 is a cross-sectional view of the combination of a single pole plate brushless motor with a rotor in accordance with the fourth embodiment of the present invention.

Referring to FIGS. 10 and 11, a single magnetic conductive plate 10 in accordance with the fourth embodiment, in comparison with the third embodiment, comprises axial pole faces 122 extending outward instead of extending inward. The axial pole faces 122 are bent outward from the pole faces 12 and applied to an axial air gap of the motor structure.

Referring again to FIG. 11 in an assembly operation, the axial pole plates 122 face the axial permanent magnet 32' of the rotor 30 to form an axial air gap. In rotation operation, an alternating magnetic field of the pole faces 122 drives the axial permanent magnet 32' of the rotor 30.

Referring again to FIGS. 1 and 2, a single magnetic conductive plate 12 is made of a single magnetic conductive sheet and punched to form a pole plate 11, pole faces 12 and an axial hole 13. The pole plate 11 serves as a base to support stator members. In comparison with the conventional motor, the single magnetic conductive plate 12 is able to simplify the entire structure, to lower manufacture cost, to reduce total thickness, and to increase design choice.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A single magnetic conductive plate for a single pole plate brushless dc motor, comprising:

a pole plate made of a single magnetic conductive sheet and serving as a base plate for combining with a coil;

a plurality of pole faces punched in the single magnetic conductive sheet; and an axial hole formed at a center of the pole plate, wherein said single magnetic conductive sheet is arranged to include a complete set of pole faces for the brushless dc motor, said brushless dc motor including a single said pole plate and no other pole plates, wherein the axial hole is adapted to combine with a mounting seat for accommodating a bearing and a rotor extending therethrough, and wherein the pole plate serves as the base plate for supporting stator members, including a printed circuit board.

2. The single magnetic conductive plate as defined in claim 1, wherein the pole faces are equi-spaced around the axial hole.

3. The single magnetic conductive plate as defined in claim 1, wherein the pole faces comprise an inner pole face set and an outer pole face set which are equi-spaced on two concentric circles.

4. The single magnetic conductive plate as defined in claim 3, wherein the inner and outer pole face sets are arranged in a staggered manner.

5. The single magnetic conductive plate as defined in claim 3, wherein the inner and outer pole face sets are arranged in a radial manner.

6. The single magnetic conductive plate as defined in claim 1, wherein the coil is proximal to an inner circumference of the pole faces.

7. The single magnetic conductive plate as defined in claim 1, wherein the coil is proximal to an outer circumference of the pole faces.

8. The single magnetic conductive plate as defined in claim 1, wherein a mounting seat projects from an area of the single magnetic conductive plate extending around the axial hole.

9. The single magnetic conductive plate as defined in claim 1, wherein the pole plate further comprises a through hole, a wire extending from the printed circuit board to an area proximate a permanent magnet of a rotor, and a Hall element connected to the wire.

10. The single magnetic conductive plate as defined in claim 9, wherein the pole plate further comprises a recession adapted to receive the Hall element.

11. A single magnetic conductive plate for a single pole plate brushless dc motor, comprising:

a pole plate made of a single magnetic conductive sheet and serving as a base plate for combining with a coil;

a plurality of pole faces punched in the single magnetic conductive sheet; and an axial hole formed at a center of the pole plate, wherein said single magnetic conductive sheet is arranged to include a complete set of pole faces for the brushless dc motor, said brushless dc motor including a single said pole plate and no other pole plates, and wherein the pole faces are further bent to form axial pole faces adapted to face an axially-facing permanent magnet of a rotor so that the axial pole faces actuate the axially-facing permanent magnet.

12. The single magnetic conductive plate as defined in claim 11, wherein the poles are bent inward to form the associated axial pole faces.

13. The single magnetic conductive plate as defined in claim 11, wherein the pole faces are bent outward to form the associated axial pole faces.

14. A single magnetic conductive plate for a single pole plate brushless dc motor, comprising:

a pole plate made of a single magnetic conductive sheet and serving as a base plate for combining with a coil;

a plurality of pole faces punched in the single magnetic conductive sheet; and an axial hole formed at a center of the pole plate, wherein said single magnetic conductive sheet is arranged to include a complete set of pole faces for the brushless dc motor, said brushless dc motor including a single said pole plate and no other pole plates, wherein the pole faces comprise an inner pole face set and an outer pole face set which are equi-spaced on two concentric circles, and wherein the coil is proximal to an inner circumference of the inner pole face set.

* * * * *